United States Patent
Kim

(10) Patent No.: US 11,868,658 B2
(45) Date of Patent: Jan. 9, 2024

(54) MEMORY CONTROLLER INCLUDING FIRST PROCESSOR FOR GENERATING COMMANDS AND SECOND PROCESSOR FOR GENERATING LOGGING INFORMATION AND METHOD OF OPERATING THE MEMORY CONTROLLER

(71) Applicant: SK hynix Inc., Icheon (KR)

(72) Inventor: Dong Hwan Kim, Icheon (KR)

(73) Assignee: SK hynix Inc., Icheon (KR)

( * ) Notice: Subject to any disclaimer, the term of this patent is extended or adjusted under 35 U.S.C. 154(b) by 79 days.

(21) Appl. No.: 17/542,860

(22) Filed: Dec. 6, 2021

(65) Prior Publication Data

US 2022/0398041 A1 Dec. 15, 2022

(30) Foreign Application Priority Data

Jun. 15, 2021 (KR) .......................... 10-2021-0077466

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0653* (2013.01); *G06F 3/0673* (2013.01)

(58) Field of Classification Search
CPC .... G06F 3/0659; G06F 3/0604; G06F 3/0634; G06F 3/0653; G06F 3/0673
See application file for complete search history.

(56) References Cited

U.S. PATENT DOCUMENTS

| | | | |
|---|---|---|---|
| 10,552,058 B1 * | 2/2020 | Jadon | G06F 3/0647 |
| 2016/0124668 A1 * | 5/2016 | Inbar | G06F 3/065 |
| | | | 711/162 |

FOREIGN PATENT DOCUMENTS

| | | | |
|---|---|---|---|
| CN | 100568173 C | * | 12/2009 |
| KR | 2018-0006101 A | | 1/2018 |
| KR | 2019-0050608 A | | 5/2019 |

\* cited by examiner

*Primary Examiner* — Edward J Dudek, Jr.

(57) ABSTRACT

A memory controller is configured with a plurality of processors to be operated in parallel so that overhead of firmware may be reduced. The memory controller includes a first processor and a second processor. The first processor is configured to generate a command corresponding to a request received from a host and to translate a logical address included in the request into a physical address of a memory device. The second processor is configured to operate on data to be output to the memory device or on data received from the memory device. If the request is received from the host when the second processor is in an idle state, the first processor may control the second processor to release the idle state of the second processor and to perform an operation of logging command information corresponding to the request.

18 Claims, 13 Drawing Sheets

MEMORY CONTROLLER INCLUDING FIRST PROCESSOR FOR GENERATING COMMANDS AND SECOND PROCESSOR FOR GENERATING LOGGING INFORMATION AND METHOD OF OPERATING THE MEMORY CONTROLLER

CROSS-REFERENCE TO RELATED APPLICATION

The present application claims priority under 35 U.S.C. § 119(a) to Korean patent application number 10-2021-0077466, filed on Jun. 15, 2021, which is incorporated herein by reference in its entirety.

BACKGROUND

1. Technical Field

Embodiments of the present disclosure generally relate to an electronic device, and more particularly, to a memory controller and a method of operating the memory controller.

2. Related Art

Generally, a storage device is a device which stores data under control of a host device such as a computer, a smartphone, or a smartpad. According to the type of device provided to store data, examples of storage devices may be classified into a device such as a hard disk drive (HDD) which stores data in a magnetic disk, and a device such as a solid state drive (SSD) or a memory card which stores data in a semiconductor memory, particularly, a nonvolatile memory.

The storage device may include a memory device in which data is stored and a memory controller configured to store data in the memory device. Memory devices may be classified into volatile memories and nonvolatile memories. Representative examples of nonvolatile memories may include read only memory (ROM), programmable ROM (PROM), electrically programmable ROM (EPROM), electrically erasable programmable ROM (EEPROM), flash memory, phase-change random access memory (PRAM), magnetic RAM (MRAM), resistive RAM (RRAM), ferroelectric RAM (FRAM), etc.

SUMMARY

Various embodiments of the present disclosure are directed to a memory controller configured to make it possible for a plurality of processors to be operated in parallel so that overhead of firmware may be reduced, and a method of operating the memory controller.

An embodiment of the present disclosure may provide for a memory controller configured to control a memory device, and including: a first processor configured to generate a command corresponding to a request received from a host, and translate a logical address included in the request into a physical address of the memory device; and a second processor configured to operate on data to be output to the memory device or on data received from the memory device. If the request is received from the host when the second processor is in an idle state, the first processor may control the second processor to release the idle state of the second processor and to perform an operation of logging command information corresponding to the request.

An embodiment of the present disclosure may provide for a method of operating the memory controller including a first processor and a second processor and configured to control a memory device, the method including: generating a command corresponding to a request received from a host, and translating a logical address corresponding to the request into a physical address of the memory device; outputting the command and the physical address to the memory device; determining whether the second processor is in an idle state; after the second processor enters the idle state, releasing the idle state of the second processor; and controlling the second processor to perform an operation of logging command information corresponding to the request.

DETAILED DESCRIPTION

Specific structural or functional descriptions in the embodiments of the present disclosure introduced in this specification or application are only for description of the embodiments of the present disclosure. Embodiments of the present disclosure should not be construed as being limited to the embodiments described in the specification or application.

Figure 1:
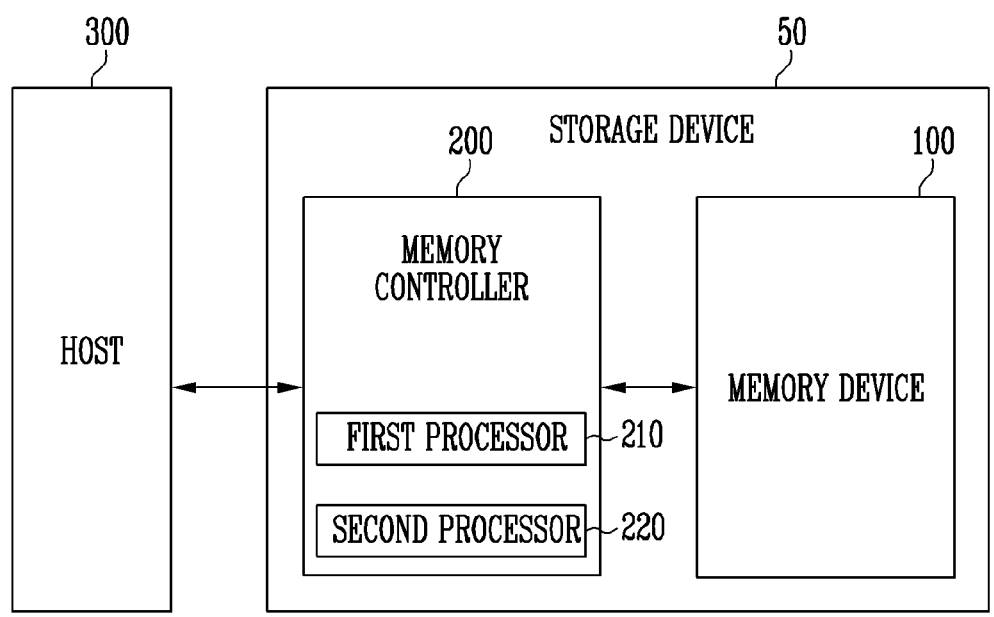
FIG. 1 is a block diagram illustrating a storage device.

FIG. 1 is a block diagram illustrating a storage device 50.

The storage device 50 may include a memory device 100 and a memory controller 200.

The storage device 50 may be a device configured to store data under control of a host 300. Non-limiting examples of the host 300 include a cellular phone, a smartphone, an MP3 player, a laptop computer, a desktop computer, a game machine, a TV, a tablet PC, or an in-vehicle infotainment system.

The storage device 50 may be manufactured as any one of various kinds of storage devices depending on a host interface, which is a communication system for communicating with the host 300. For example, the storage device 50 may be configured of an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, or a memory stick.

The storage device 50 may be manufactured in the form of any one of various package types. For instance, the storage device 50 may be manufactured in the form of a package on package (POP) type, a system in package (SIP) type, a system on chip (SOC) type, a multi-chip package (MCP) type, a chip on board (COB) type, a wafer-level fabricated package (WFP) type, or a wafer-level stack package (WSP) type.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. A plurality of memory cells may form a plurality of pages. In an embodiment, each page may be the unit of storing data in the memory device 100 or of reading stored data from the memory device 100. In an embodiment, each memory block may be the unit of erasing data in the memory device 100.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In the present specification, for the sake of explanation, it is assumed that the memory device 100 is a NAND flash memory.

The memory device 100 may be implemented in a two-dimensional array structure or a three-dimensional array structure. Hereinafter, although a two-dimensional array structure will be described for illustrative purposes, the present disclosure is not limited to the two-dimensional array structure. The present disclosure may be applied not only to a flash memory device in which a charge storage layer is formed of a conductive floating gate (FG), but also to a charge trap flash (CTF) memory in which a charge storage layer is formed of an insulating layer.

In an embodiment, the memory device 100 may be operated in a single-level cell (SLC) manner of storing one data bit in each memory cell. Alternatively, the memory device 100 may be operated in a manner of storing at least two data bits in each memory cell. For example, the memory device 100 may be operated in a multi-level cell (MLC) manner of storing two data bits in each memory cell, a triple-level cell (TLC) manner of storing three data bits in each memory cell, or a quad-level cell (QLC) manner of storing four data bits in each memory cell.

The memory device 100 may receive a command and an address from the memory controller 200 and access an area of the memory cell array that is selected by the address. In other words, the memory device 100 may perform an operation corresponding to the command on the area selected by the address. For example, in response to a received command, the memory device 100 may perform a write (program) operation, a read operation, or an erase operation. For example, when a program command is received, the memory device 100 may program data in an area selected by an address. When a read command is received, the memory device 100 may read data from an area selected by an address. When an erase command is received, the memory device 100 may erase data from an area selected by an address.

The memory controller 200 may control overall operation of the storage device 50.

When a power supply voltage is applied to the storage device 50, the memory controller 200 may execute firmware. In the case where the memory device 100 is a flash memory device 100, the memory controller 200 may execute firmware such as a flash translation layer (FTL) for controlling communication between the host 300 and the memory device 100.

In an embodiment, the memory controller 200 may include firmware which receives data and a logical block address (LBA) from the host 300, and translates the LBA into a physical block address (PBA) indicating addresses of memory cells in the memory device 100 into which data is to be stored. The memory controller 200 may store, in a buffer memory, a logical-physical address mapping table indicating mapping relationship between logical block addresses (LBAs) and physical block addresses (PBAs).

In response to a request from the host 300, the memory controller 200 may control the memory device 100 to perform a program operation, a read operation, or an erase operation. For example, if a program request is received from the host 300, the memory controller 200 may change the program request into a program command and provide the program command, a PBA, and data to the memory device 100. If a read request along with an LBA is received from the host 300, the memory controller 200 may change a read request into a read command, select a PBA corresponding to the LBA, and provide the read command and the PBA to the memory device 100. If an erase request along with an LBA is received from the host 300, the memory controller 200 may change the erase request into an erase command, select a PBA corresponding to the LBA, and provide the erase command and the PBA to the memory device 100.

In an embodiment, the memory controller 200 may include first and second processors 210 and 220. The first and second processors 210 and 220 may be different types of processors, and include respective memories and access the respective memories. The first and second processors 210 and 220 may be simultaneously operated. In an illustrative example embodiment, the first processor 210 may be a flexible central processing unit (FCPU) and the second processor 220 may be a tensor processing unit (TPU).

The first processor 210 may perform an address translation operation of translating a logical block address into a physical block address using a flash translation layer. In other words, the first processor 210 may generate, in the mapping table, mapping information between a logical address on the host 300 and a physical position on the memory device 100 using the flash translation layer.

The second processor 220 may be a hardware for data analysis and deep learning. Here, deep learning may be a type of artificial intelligence wherein data is learned using an information input layer, an output layer, and at least one hidden layer coupled between the information input layer and the output layer. Deep learning is capable of self-learning data to be used for classification. The second processor 220 may reduce power consumption by generating an operation result in an operation circuit specifically designed to perform the operation.

In an embodiment, after having transmitted a command to the memory device 100, the first processor 210 may log command information corresponding to the command in a specific area of a memory (e.g., a data tightly coupled memory (DTCM)). Logging may be an operation of generating a series of records by performing a data processing process corresponding to the command information.

However, the first processor 210 may not perform another operation while it is logging the command information. Therefore, the present disclosure discloses a process of using the second processor 220 to perform a logging operation which would otherwise be performed by the first processor 210, so that the first processor 210 is allowed to perform another operation rather than the logging operation while the second processor 220 performs the logging operation.

In other words, the present disclosure discloses a process in which, while the second processor 220 logs the command information, the first processor 210 may perform another operation so that the first and second processors 210 and 220 can be operated in parallel, so that overhead of the firmware may be reduced.

In an embodiment, the memory controller 200 may control at least two or more memory devices. In this case, the memory controller 200 may control the memory devices in an interleaving manner so as to enhance the operating performance.

The host 300 may communicate with the storage device 50 using at least one of various communication protocols such as the universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multi-media card (MMC), embedded MMC (eMMC), dual in-line memory module (DIMM), registered DIMM (RDIMM), or load reduced DIMM (LRDIMM) communication protocols.

Figure 2:
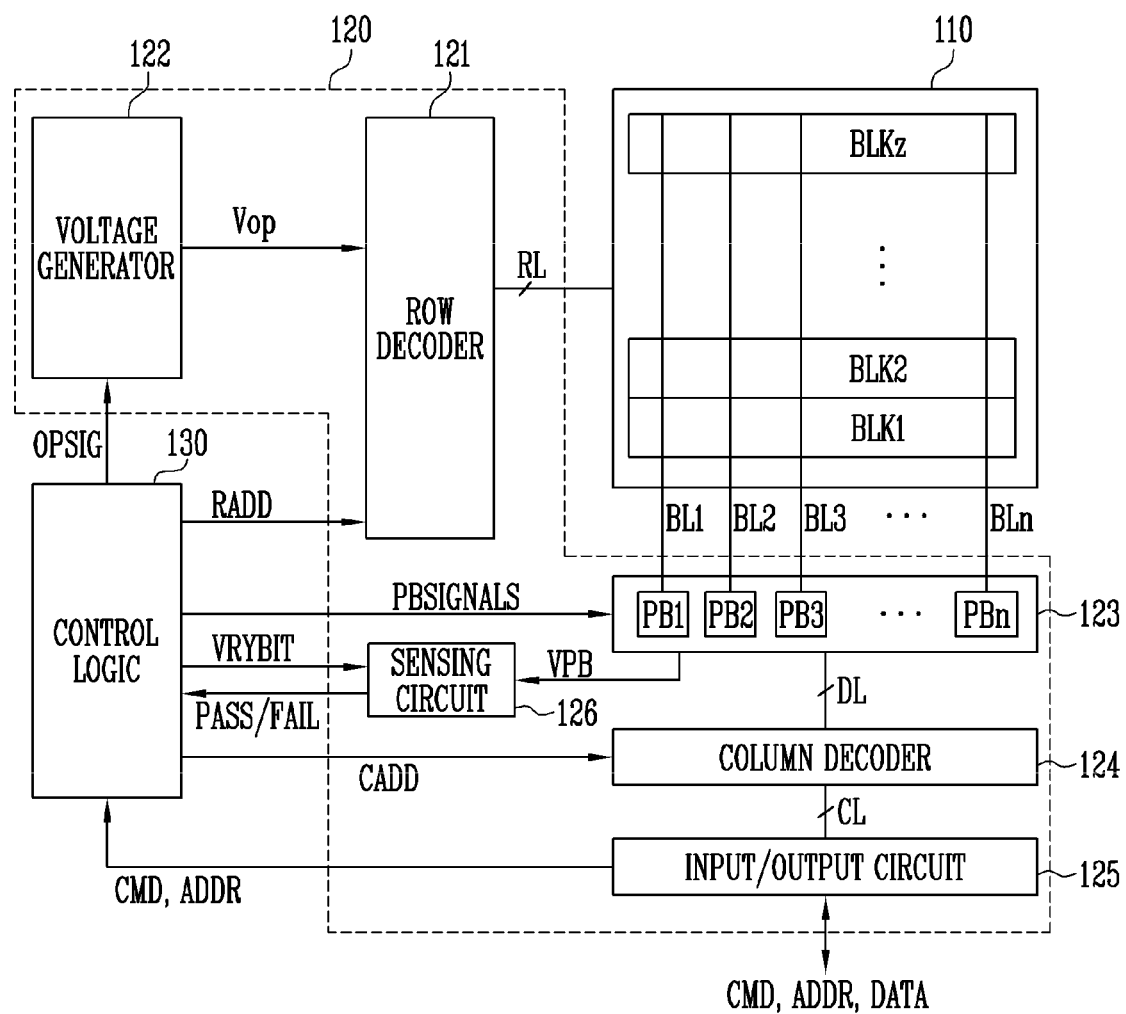
FIG. 2 illustrates a structure of a memory device of FIG. 1.

FIG. 2 illustrates a structure of the memory device 100 of FIG. 1.

Referring to FIG. 2, the memory device 100 may include a memory cell array 110, a peripheral circuit 120, and control logic 130.

The memory cell array 110 may include a plurality of memory blocks BLK1 to BLKz. The plurality of memory blocks BLK1 to BLKz are connected to a row decoder 121 through row lines RL. The plurality of memory blocks BLK1 to BLKz may be connected to a page buffer group 123 through bit lines BL1 to BLn. Each of the memory blocks BLK1 to BLKz may include a plurality of memory cells. In an embodiment, the plurality of memory cells may be nonvolatile memory cells. Memory cells connected to the same word line may be defined as one page. Hence, each memory block may include a plurality of pages.

The row lines RL may include at least one source select line, a plurality of word lines, and at least one drain select line.

Each of the memory cells included in the memory cell array 110 may comprise a single level cell (SLC) capable of storing a single data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, or an erase operation on a selected area of the memory cell array 110 under control of the control logic 130. The peripheral circuit 120 may drive the memory cell array 110. For example, the peripheral circuit 120 may apply various operating voltages to the row lines RL and the bit lines BL1 to BLn or discharge the applied voltages, under control of the control logic 130.

The peripheral circuit 120 may include the row decoder 121, a voltage generator 122, the page buffer group 123, a column decoder 124, an input/output circuit 125, and a sensing circuit 126.

The row decoder 121 is connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 may select at least one memory block of the memory blocks BLK1 to BLKz in response to the decoded address. The row decoder 121 may select at least one word line WL of the selected memory block in response to the decoded address so that voltages generated from the voltage generator 122 are applied to the at least one word line WL.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, an erase operation of the memory device 100 may be performed on a memory block basis. During an erase operation, the row decoder 121 may select one memory block in response to a decoded address. During the erase operation, the row decoder 121 may apply a ground voltage to word lines connected to the selected memory block.

The voltage generator 122 may operate under control of the control logic 130. The voltage generator 122 may generate a plurality of voltages using an external supply voltage supplied to the memory device 100. In detail, the voltage generator 122 may generate various operating voltages Vop to be used for a program operation, a read operation, and an erase operation in response to an operating signal OPSIG. For example, the voltage generator 122 may generate a program voltage, a verify voltage, a pass voltage, a read voltage, an erase voltage, and so forth under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using an external power supply voltage or an internal power supply voltage.

For example, the voltage generator 122 may include a plurality of pumping capacitors for receiving the internal supply voltage and generate a plurality of voltages by selectively activating the plurality of pumping capacitors under control of the control logic 130.

The generated voltages may be supplied to the memory cell array 110 by the row decoder 121.

The page buffer group 123 may include first to n-th page buffers PB1 to PBn. The first to n-th page buffers PB1 to PBn are connected to the memory cell array 110 through the first to n-th bit lines BL1 to BLn, respectively. The first to n-th page buffers PB1 to PBn may operate under control of the control logic 130. In detail, the first to n-th page buffers PB1 to PBn may operate in response to page buffer control signals PBSIGNALS. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

In detail, during a program operation, the first to n-th page buffers PB1 to PBn may transmit data DATA received through the input/output circuit 125 to selected memory cells through the first to n-th bit lines BL1 to BLn when a program voltage is applied to a selected word line. The memory cells in the selected page are programmed based on the transmitted data DATA. During a program verify operation, the first to n-th page buffers PB1 to PBn may read page data by sensing voltages or currents received from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the input/output circuit 125 under control of the column decoder 124.

During an erase operation, the first to n-th page buffers PB1 to PBn may float the first to n-th bit lines BL1 to BLn or apply erase voltages thereto.

The column decoder 124 may transmit data between the input/output circuit 125 and the page buffer group 123 in response to a column address CADD. For example, the column decoder 124 may exchange data with the first to n-th page buffers PB1 to PBn through data lines DL or exchange data with the input/output circuit 125 through column lines CL.

The input/output circuit 125 may transmit, to the control logic 130, a command CMD or an address ADDR received from the memory controller (the memory controller 200 of FIG. 1) described with reference to FIG. 1, or may exchange data DATA with the column decoder 124.

During a read operation or a verify operation, the sensing circuit 126 may generate a reference current in response to an enable bit signal VRYBIT, and may compare a sensing voltage VPB received from the page buffer group 123 with a reference voltage generated by the reference current and output a pass signal PASS or a fail signal FAIL.

The control logic 130 may output an operating signal OPSIG, a row address RADD, page buffer control signals PBSIGNALS, and an enable bit signal VRYBIT in response to a command CMD and an address ADD, and thus control the peripheral circuit 120. For example, the control logic 130 may control a read operation of a selected memory block in response to a sub-block read command and an address. Furthermore, the control logic 130 may control an erase operation of a selected sub-block included in a selected memory block, in response to a sub-block erase command and an address. In addition, the control logic 130 may determine whether a target memory cell has passed a verification during a verify operation in response to a pass signal PASS or a fail signal FAIL.

Figure 3:
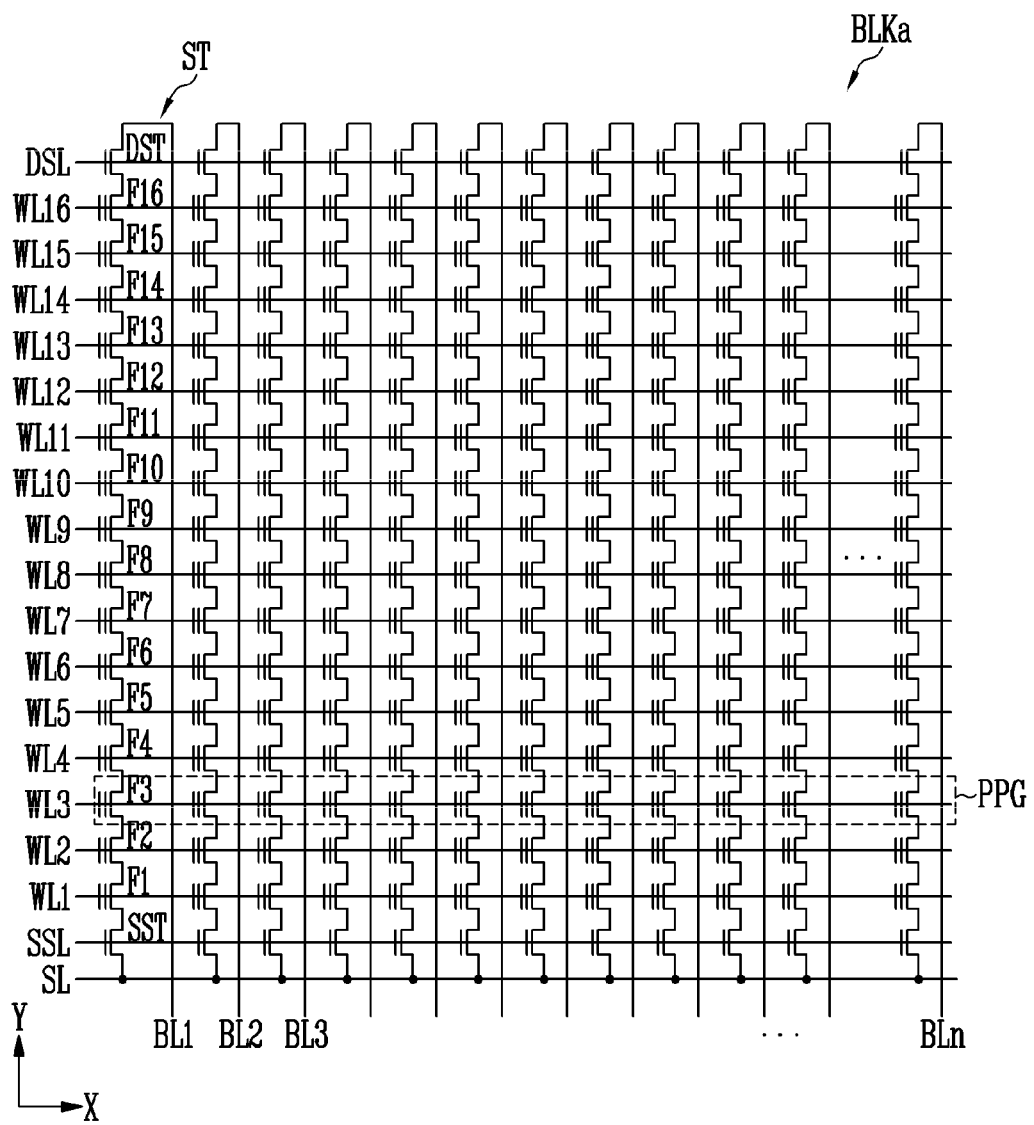
FIG. 3 illustrates an embodiment of a memory cell array of FIG. 2.

FIG. 3 illustrates an embodiment of the memory cell array 110 of FIG. 2.

Referring to FIGS. 2 and 3, FIG. 3 is a circuit diagram illustrating any one memory block BLKa of the plurality of memory blocks BLK1 to BLKz included in the memory cell array 110 of FIG. 2.

The memory block BLKa may be connected with a first select line, word lines, and a second select line which are arranged parallel to each other. For example, the word lines may be arranged parallel to each other between the first and second select lines. Here, the first select line may be a source select line SSL, and the second select line may be a drain select line DSL.

In more detail, the memory block BLKa may include a plurality of strings connected between the bit lines BL1 to BLn and the source line SL. The bit lines BL1 to BLn may be respectively coupled to the strings, and the source lines SL may be connected in common to the strings. The strings may have the same configuration; therefore, the string ST that is connected to the first bit line BL1 will be described in detail by way of example.

The string ST may include a source select transistor SST, a plurality of memory cells F1 to F16, and a drain select transistor DST which are connected in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be connected to the source line SL, and a drain of the drain select transistor DST may be connected to the first bit line BL1. The memory cells F1 to F16 may be coupled in series between the source select transistor SST and the drain select transistor DST. Gates of the source select transistors included in different strings may be connected to the source select line SSL, gates of the drain select transistors may be connected to the drain select line DSL, and gates of the memory cells F1 to F16 may be connected to the plurality of word lines WL1 to WL16. Among the memory cells included in different strings, a group of memory cells coupled to each word line may be referred to as a physical page PPG. Therefore, the number of physical pages included in the memory block BLKa may correspond to the number of word lines WL1 to WL16.

Each memory cell may store 1-bit data. A memory cell storing 1-bit data is typically called a single level cell (SLC). In this case, each physical page PPG may store data of a single logical page LPG. Data of each logical page LPG may include data bits corresponding to the number of memory cells included in a single physical page PPG. Furthermore, each memory cell may store 2- or more-bit data. A memory cell storing 2-bit data is typically called a multi-level cell (MLC). In this case, each physical page PPG may store data of two or more logical pages LPG.

Although a memory cell capable of storing 2- or more-bit data is called a multi-level cell (MLC), the number of bits of data capable of being stored in each memory cell is recently increased, so that the term "MLC" refers to a memory cell capable of 2-bit data, a memory cell capable of storing 3- or more-bit data is called a triple level cell (TLC), and a memory cell capable of storing 4- or more-bit data may be called a quadruple level cell (QLC). In addition, a memory cell scheme in which a plurality of bits of data can be stored in each memory cell has been developed. Embodiments of the present disclosure may be applied to the memory device 100 in which 2- or more-bit data are stored in each memory cell.

In an embodiment, each memory block may have a three-dimensional structure. Each memory block may include a plurality of memory cells stacked on a substrate. The memory cells are arranged in a +X direction, a +Y direction, and a +Z direction.

Figure 4:
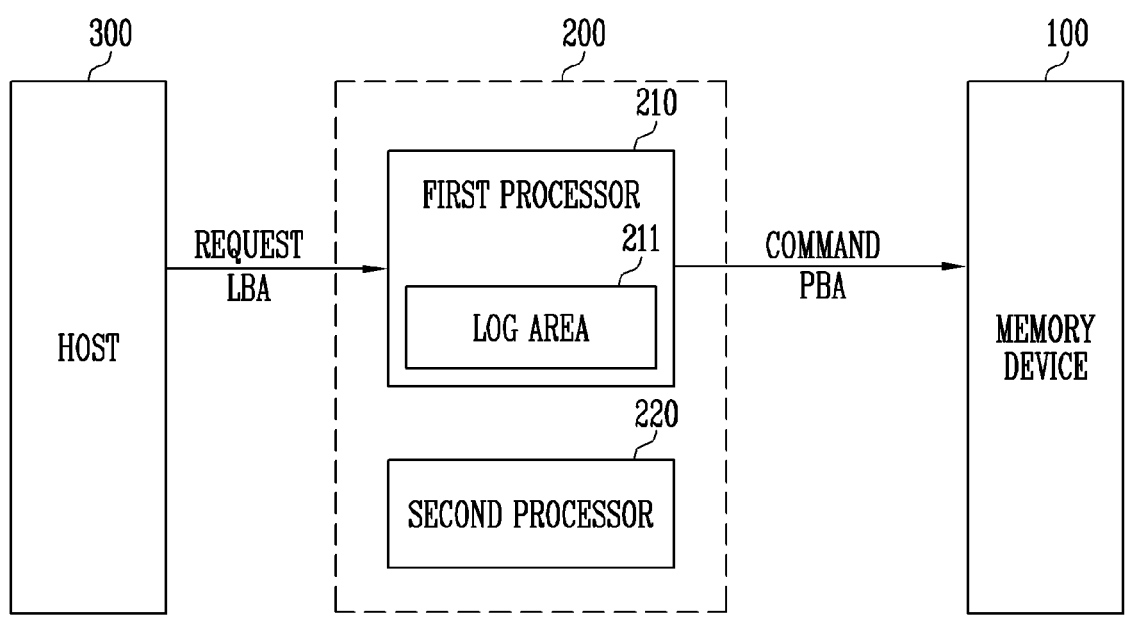
FIG. 4 illustrates configuration of a memory controller of FIG. 1.

FIG. 4 illustrates configuration of the memory controller 200 of FIG. 1.

Referring to FIGS. 1 and 4, FIG. 4 illustrates the first and second processors 210 and 220 included in the memory controller 200 of FIG. 1. FIG. 4 illustrates a process through which a command corresponding to a request output from the host 300 of FIG. 1 is output, and an operation of the first processor 210.

In an embodiment, the first processor 210 may receive, from the host 300, a request and a logical block address (LBA) corresponding to the request. The request received from the host 300 may be a program request, a read request, or an erase request. The program request may be a request indicating that data is to be programmed into the memory device 100. The read request may be a request indicating that data stored in the memory device 100 is to be read. The erase request may be a request indicating that data programmed to the memory device 100 is to be erased. Furthermore, a command corresponding to the program request may be a program command. A command corresponding to the read request may be a read command. A command corresponding to the erase request may be an erase command.

In an embodiment, the first processor 210 may translate an LBA into a physical block address (PBA) through the flash translation layer. Thereafter, the first processor 210 may output the translated PBA along with the command corresponding to the request to the memory device 100. Here, the command corresponding to the request may be a program command, a read command, or an erase command.

After having received the command and the PBA, the memory device 100 may perform an operation corresponding to the command.

In an embodiment, the first processor 210 may output the command to the memory device 100, and thereafter generate and store command information including some of information included in the command. Here, the command information may include the type of command output to the memory device 100, a location at which the command is to be performed, voltage information when the command is performed, etc.

The first processor 210 may log the generated command information in the log area 211. Logging may refer to an operation of generating a series of records by performing a data processing operation. The log area 211 may comprise a data tightly coupled memory (DTCM). The DTCM may comprise a static random access memory (SRAM).

However, while the first processor 210 logs the command information in the log area 211, the first processor 210 cannot perform another operation, so that a data process speed may be reduced.

Embodiments of the present disclosure include a process in which the second processor 220 rather than the first processor 210 logs the command information, while the first processor 210 performs another operation.

Figure 5:
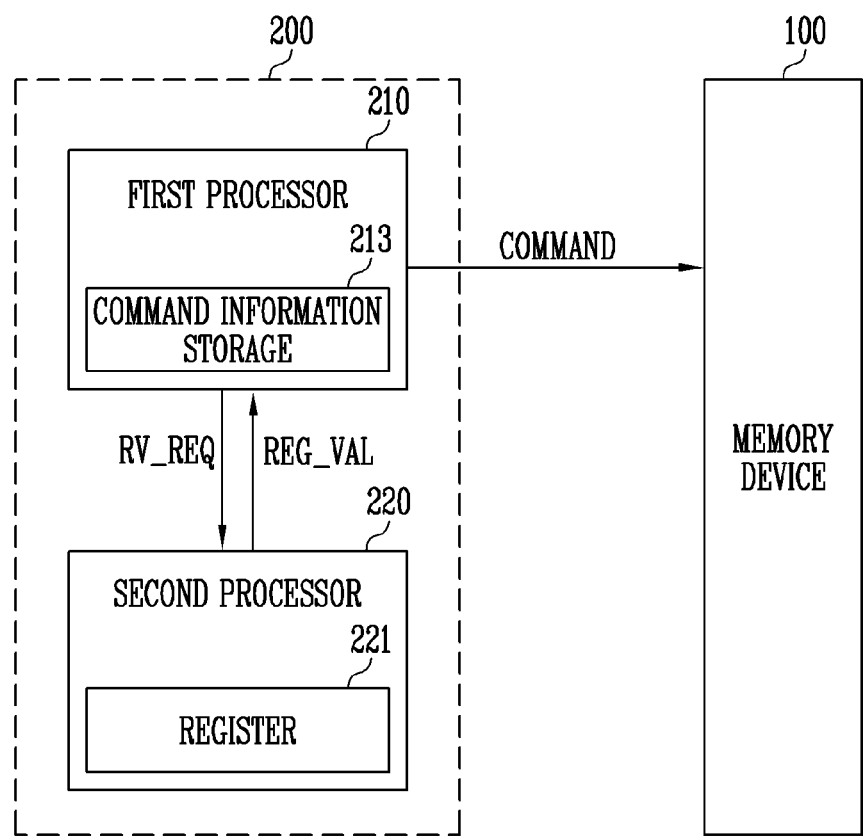
FIG. 5 illustrates an operation before a second processor logs command information.

FIG. 5 illustrates an operation before the second processor logs the command information.

Referring to FIGS. 4 and 5, FIG. 5 illustrates a process of checking whether the second processor 220 is in an idle state before the second processor 220 logs the command information and after the first processor 210 of FIG. 4 stores the command information.

Referring to FIG. 5, the first processor may include a command information storage 213 capable of storing the command information. The command information storage 213 may comprise a static random access memory (SRAM).

Referring to FIG. 5, the second processor 220 may include a register 221. The register 221 may indicate whether the second processor 220 is in the idle state. For example, if the second processor 220 is in the idle state, the second processor 220 may set a register value REG_VAL to '0'. However, if the second processor 220 is in a state other than the idle state (e.g., a busy state), the second processor 220 may set the register value REG_VAL to '1'. When the register value REG_VAL is set '0', the second processor 220 may periodically check whether the register value REG_VAL has been changed to '1'.

In an embodiment, the first processor 210 may output a command corresponding to a request received from the host (refer to the host 300 of FIG. 4) to the memory device 100, and thereafter generate command information and store the command information in the command information storage 213.

In an embodiment, after the first processor 210 stores the command information, it may determine whether the second processor 220 is in the idle state. When the second processor 220 is in the idle state, the first processor 210 may determine that the idle state of the second processor 220 allows the second processor 220 to receive the command information and a trigger signal from the first processor 210 and log the command information after releasing the idle state. When it is determined that the second processor 220 is in the idle state, the second processor 220 rather than the first processor 210 may log the command information.

To determine whether the second processor 220 is in the idle state, the first processor 210 may, after storing the command information, output to the second processor 220 a register value request RV_REQ for requesting a register value REG_VAL. In response to the register value request RV_REQ, the second processor 220 may output the register value REG_VAL set in the register 221 to the first processor 210.

In an embodiment, the first processor 210 may determine whether the second processor 220 is in the idle state based on the register value REG_VAL received from the second processor 220. For example, if the register value REG_VAL is '0', the first processor 210 may determine that the second processor 220 is in the idle state. If the register value REG_VAL is '1', the first processor 210 may determine that the second processor 220 is in a state other than the idle state.

Figure 6:
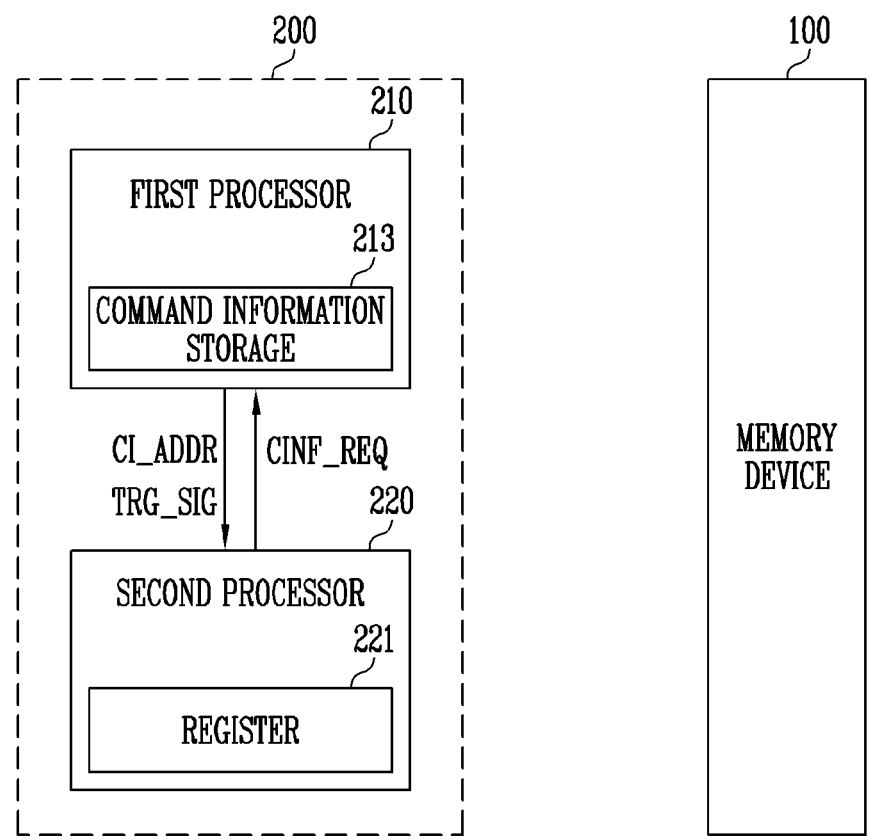
FIG. 6 illustrates a process of requesting, by the second processor, command information based on a trigger signal.

FIG. 6 illustrates a process of requesting, by the second processor, command information based on a trigger signal.

Referring to FIGS. 5 and 6, FIG. 6 illustrates an operation of the first and second processors 210 and 220 when the register value REG_VAL that is output from the second processor 220 as illustrated in FIG. 5 is '0'.

In an embodiment, if the second processor 220 is in the idle state, the register value REG_VAL which is output in response to the register value request RV_REQ of the first processor 210 may be '0'. If the register value REG_VAL is '0', the first processor 210 may determine that the second processor 220 is in the idle state, and thereafter output, to the second processor 220, a trigger signal TRG_SIG and a command information address CI_ADDR indicating where the command information is stored. The command information address CI_ADDR may comprise an 8 byte value and indicate a specific address number of the command information storage 213.

In an embodiment, the second processor 220 in the idle state may periodically determine whether the register value REG_VAL has changed from '0' to '1'.

If the second processor 220 receives a trigger signal TRG_SIG from the first processor 210, the second processor 220 may change the register value REG_VAL from '0' to '1'. In other words, if the trigger signal TRG_SIG is received, the second processor 220 may release the idle state. Furthermore, the second processor 220 in the idle state may periodically check whether the register value REG_VAL has been changed to '1' and thereafter perform an operation of logging the command information.

In detail, if it is determined that the register value REG_VAL has been changed to '1', the second processor 220 may output a command information request CINF_REQ based on the command information address CI_ADDR output from the first processor 210. In other words, the second processor 220 may output, to the command information storage 213, the command information request CINF_REQ for requesting command information stored at a location corresponding to the command information address CI_ADDR.

Figure 7:
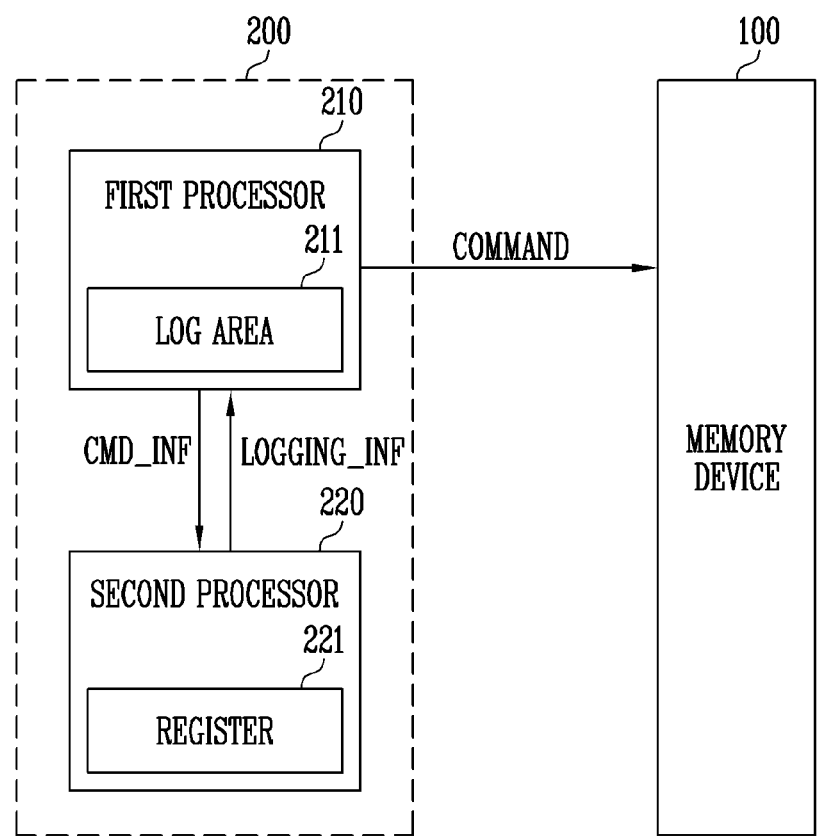
FIG. 7 illustrates a process of logging, by the second processor, command information.

FIG. 7 illustrates a process of logging, by the second processor, command information.

Referring to FIGS. 6 and 7, FIG. 7 illustrates an operation of the first and second processors 210 and 220 after the command information request CINF_REQ is output from the second processor 220 as illustrated in FIG. 6.

In an embodiment, in response to the command information request CINF_REQ, the first processor 210 may output, to the second processor 220, the command information CMD_INF stored in the command information storage 213 (shown in FIG. 6).

The second processor 220 may receive the command information CMD_INF from the first processor 210 and log the command information CMD_INF. Logging may be an operation of generating a series of records by performing a data processing process.

In an embodiment, the second processor 220 may log the command information CMD_INF and generate logging information LOGGING_INF. The second processor 220 may output the logging information LOGGING_INF to the first processor 210. The first processor 210 may store the logging information LOGGING_INF received from the second processor 220 in the log area 211.

Consequently, since the second processor 220 performs the logging operation that would otherwise have been performed by the first processor 210, the first and second processors 210 and 220 may be operated in parallel, so that the overhead of the firmware may be reduced.

In an embodiment, after outputting the logging information LOGGING_INF to the first processor 210, the second processor 220 may change the register value REG_VAL of the register 221 to '0' again. In other words, since the state of the second processor 220 is changed to the idle state again after the logging operation has been completed, the register value REG_VAL may be changed to indicate that the second processor 220 is in the idle state.

In an embodiment, while the second processor 220 logs the command information CMD_INF, the first processor 210 may perform another operation. For example, after having output the trigger signal TRG_SIG, the first processor 210 may perform an operation such as outputting a command corresponding to a request received from the host (refer to the host 300 of FIG. 4) to the memory device 100, in place of logging the command information CMD_INF.

Figure 8:
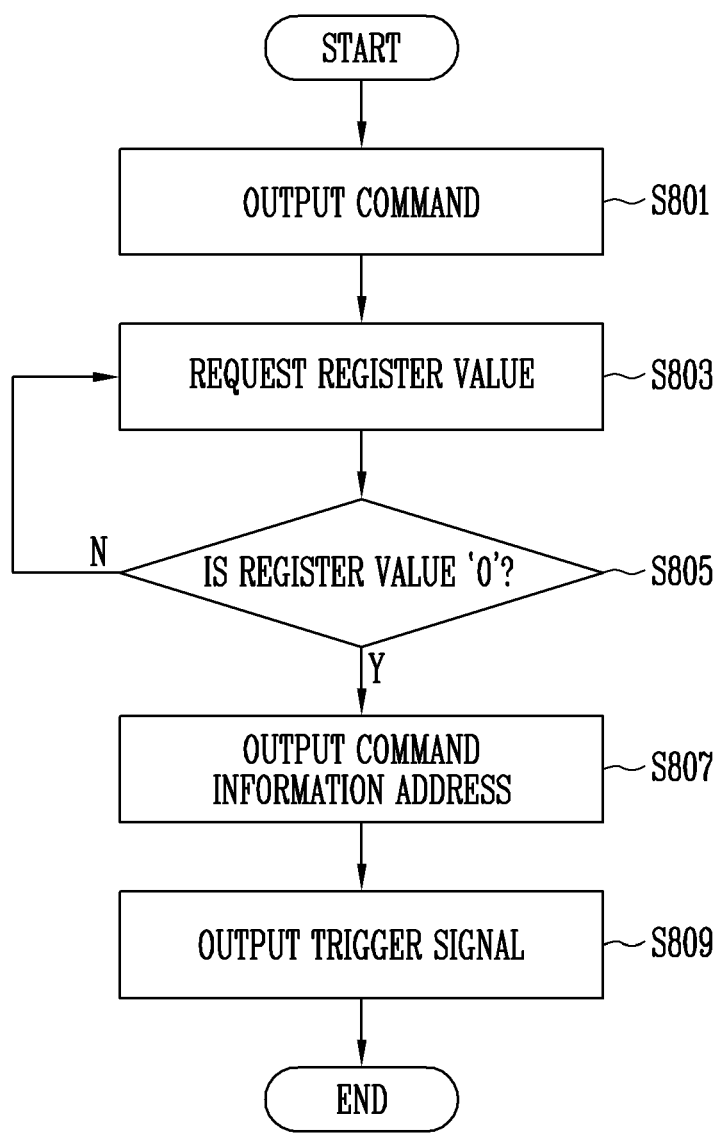
FIG. 8 illustrates an operation of the memory controller in accordance with an embodiment of the present disclosure.

FIG. 8 illustrates an operation of the memory controller in accordance with an embodiment of the present disclosure.

Referring to FIG. 8, at step S801, the first processor of the first and second processors included in the memory controller may output a command to the memory device. In detail, the first processor may generate a command corresponding to a request received from the host and output the command to the memory device. In addition, the first processor may translate a logical block address corresponding to the request into a physical block address, and output the physical block address along with the command to the memory device.

At step S803, the first processor may request, from the second processor, a register value stored in a register of the second processor. The register value may indicate the state of the processor. For example, if the register value is '0', the second processor may be in the idle state. If the register value is '1', the second processor may be in a state other than the idle state.

At step S805, the first processor may determine whether the register value received from the second processor is '0'. In other words, the first processor may determine whether the second processor is in the idle state, based on the register value.

When the register value received from the second processor is not '0' (path N from step S805), the process may proceed to step S803, so that the first processor may request a register value from the second processor again. In other words, the first processor may request the register value from the second processor until the second processor enters the idle state. However, if the register value received from the second processor is '0' (path Y from step S805), the process may proceed to step S807.

At step S807, the first processor may output a command information address to the second processor. The command information address may indicate a location at which command information is stored in the first processor.

At step S809, the first processor may output a trigger signal to the second processor. In detail, the first processor may output the trigger signal so that the second processor in lieu of the first processor may log the command information. After having received the trigger signal, the second processor may change the register value to '1' and perform an operation of logging command information based on the command information address.

In other words, if the second processor enters the idle state, the second processor may release the idle state based on the trigger signal received from the first processor, and log the command information based on the command information address.

Figure 9:
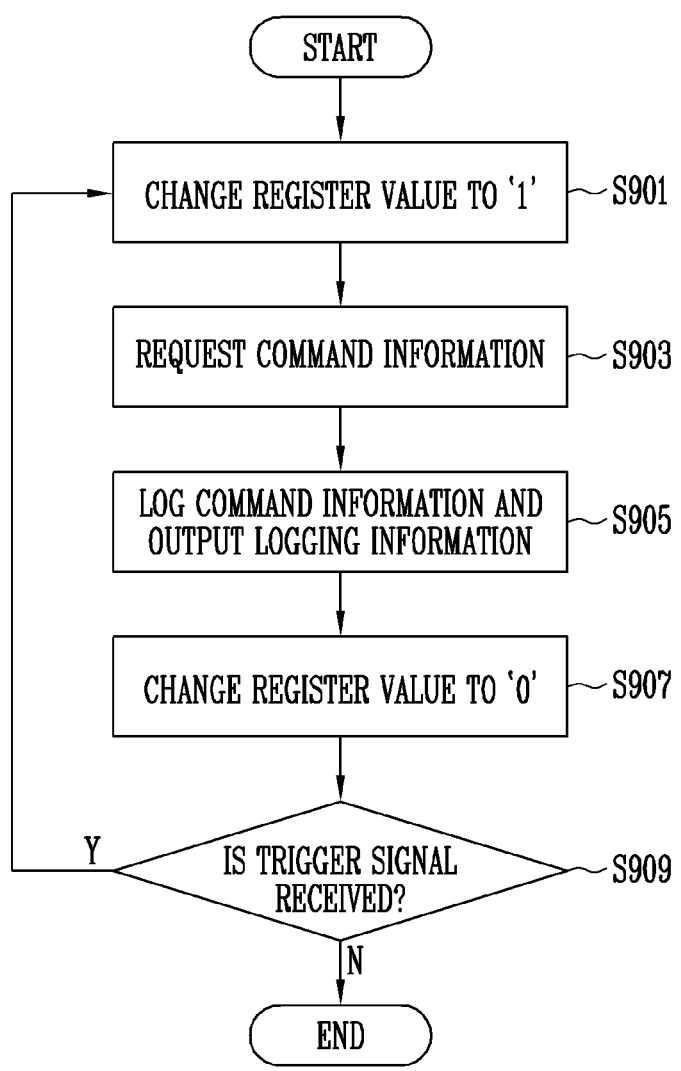
FIG. 9 illustrates an operation of the memory controller in accordance with an embodiment of the present disclosure.

FIG. 9 illustrates an operation of the memory controller in accordance with an embodiment of the present disclosure.

Referring to FIGS. 8 and 9, FIG. 9 illustrates steps performed after the first processor outputs the trigger signal at step S809 of FIG. 8.

At step S901, the second processor of the first and second processors included in the memory controller may change the register value to '1'. In detail, the second processor may change the register value to '1' based on the trigger signal received from the first processor, and release the idle state.

At step S903, the second processor may request command information from the first processor. In detail, the second processor may request the command information stored at a location corresponding to the command information address received from the first processor.

At step S905, the second processor may log the command information received from the first processor, and output the logging information to the first processor. Here, logging may be an operation of generating a series of records during a data processing process.

In detail, released from the idle state, the second processor may log the command information and generate the logging information in lieu of the first processor. The second processor may output the generated logging information to the first processor. The first processor may receive the logging information and store the logging information in the log area.

At step S907, the second processor may change the register value to '0'. In other words, after the second processor logs the command information, the second processor may enter the idle state again.

At step S909, the second processor may determine whether a trigger signal has been received from the first processor. If the second processor receives the trigger signal (path Y from step S909), the process may proceed to step S901, so that the second processor may change the register value to '1' to release the idle state, and perform operations for logging command information.

Figure 10:
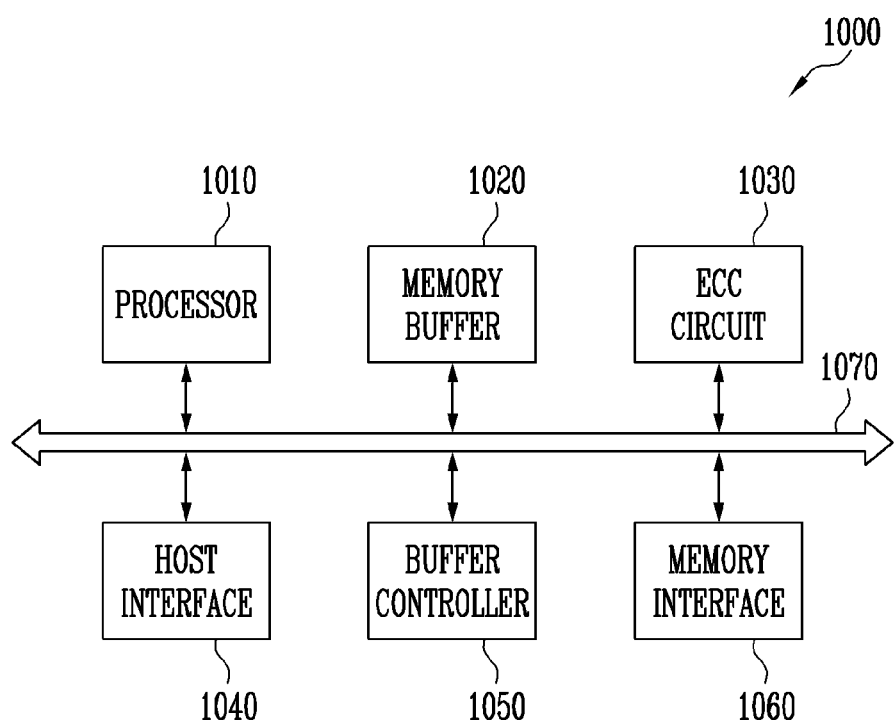
FIG. 10 illustrates another embodiment of the memory controller of FIG. 1.

FIG. 10 illustrates another embodiment of the memory controller of FIG. 1.

A memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 10, the memory controller 1000 may include a processor 1010, a memory buffer 1020, an error correction code (ECC) circuit 1030, a host Interface 1040, a buffer controller 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040 and communicate with the memory device through the memory interface 1060. In addition, the processor 1010 may communicate with the memory buffer 1020 through the buffer controller 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping algorithm using the FTL may be modified in various ways depending on the unit of mapping. Representative address mapping algorithms may include a page mapping algorithm, a block mapping algorithm, and a hybrid mapping algorithm.

The processor 1010 may randomize data received from the host. For example, the processor 1010 may use a randomizing seed to randomize data received from the host. Randomized data may be provided to the memory device as data to be stored, and may be programmed to the memory cell array.

The processor 1010 may drive software or firmware to perform the randomizing operation or the derandomizing operation.

The memory buffer 1020 may be used as a working memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication protocols such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multi-media card (MMC), an embedded MMC (eMMC), a dual in-line memory module (DIMM), a registered DIMM (RDIMM), or a load reduced DIMM (LRDIMM) communication protocols.

The buffer controller 1050 may control the memory buffer 1020 under control of the processor 1010.

The memory interface 1060 may communicate with the memory device under control of the processor 1010. The memory interface 1060 may communicate a command, an address, and data with the memory device through the channel.

For example, the memory controller 1000 may include neither the memory buffer 1020 nor the buffer controller 1050.

For example, the processor 1010 may control the operation of the memory controller 1000 by using codes. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be connected to the host interface 1040, the buffer controller 1050, the ECC circuit 1030, and the memory interface 1060. The control bus may be connected to the host interface 1040, the processor 1010, the buffer controller 1050, the memory buffer 1020, and the memory interface 1060.

In an embodiment, the processor 1010 may include first and second processors respectively corresponding to the first and second processors 210 and 220 of FIGS. 1 and 4-7. The first and second processors may be different types of processors, and include respective memories and access each other's memories. Furthermore, the first processor may perform an address translation operation of translating a logical block address into a physical block address through the flash translation layer. The second processor may perform data analysis and deep learning.

In an embodiment, the first processor may store command information corresponding to a command output to the memory device (such as memory device 100 of FIG. 1), and request a register value stored in the register of the second processor. The register value may indicate whether the second processor is in the idle state. The second processor may output the register value to the first processor in response to the request from the first processor.

If the register value output to the first processor indicates that the second processor is in the idle state, the first processor may output to the second processor a trigger signal and a command information address in which the command information is stored. The second processor may change the register value based on the trigger signal, and request, to the first processor, command information stored at a location corresponding to the command information address. Here, the second processor may change the register value in response to the trigger signal so that the idle state is released.

In an embodiment, the first processor may output the command information to the second processor in response to the command information request. After having output the command information, the first processor may perform another operation in lieu of logging the command information. In other words, while the second processor logs the command information, the first processor may perform an operation other than the logging operation.

The second processor may receive the command information from the first processor and log the command information to generate logging information. The second processor may output the logging information to the first processor. The first processor may store the logging information in the log area.

Consequently, since the second processor, in lieu of the first processor, logs the command information, the time it takes to perform the logging operation may be reduced, and the first and second processors may be operated in parallel.

Figure 11:
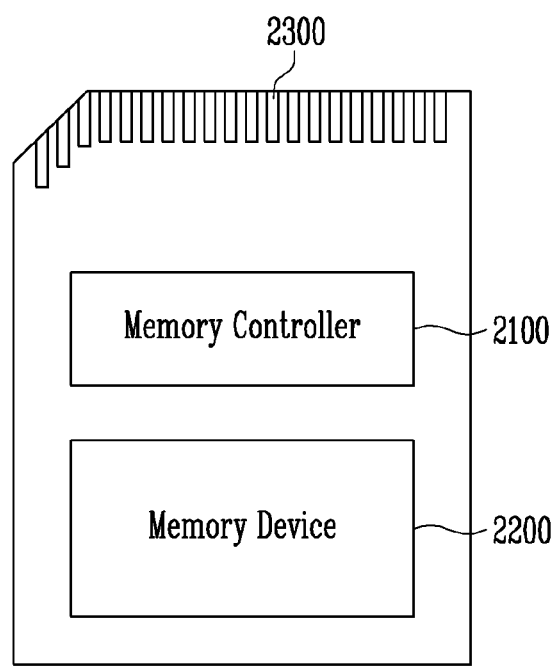
FIG. 11 is a block diagram illustrating a memory card system to which the storage device in accordance with an embodiment of the present disclosure is applied.

FIG. 11 is a block diagram illustrating a memory card system 2000 to which the storage device in accordance with an embodiment of the present disclosure is applied.

Referring FIG. 11, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory device 2200 may be embodied in the same manner as that of the memory device (the memory device 100 of FIG. 1) described with reference to FIG. 1.

In an embodiment, the memory controller 2100 may include components such as a random access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

In an embodiment, the memory controller 2100 may include first and second processors. The first and second processors may be different types of processors, and include respective memories and access each other's memories. Furthermore, the first processor may perform an address translation operation of translating a logical block address into a physical block address through the flash translation layer. The second processor may perform data analysis and deep learning.

In an embodiment, the first processor may store command information corresponding to a command output to the memory device 2200, and request a register value stored in the register of the second processor. The register value may indicate whether the second processor is in the idle state. The second processor may output the register value to the first processor in response to the request from the first processor.

If the register value output to the first processor indicates that the second processor is in the idle state, the first processor may output a trigger signal and a command information address in which the command information is stored. The second processor may change the register value based on the trigger signal, and request, to the first processor, command information stored at a location corresponding to the command information address. Here, the second processor may change the register value in response to the trigger signal so that the idle state is released.

In an embodiment, the first processor may output the command information to the second processor in response to the command information request. After having output the command information, the first processor may perform another operation in lieu of logging the command information. In other words, while the second processor logs the command information, the first processor may perform an operation other than the logging operation.

The second processor may receive the command information from the first processor and log the command information, and generate the logging information. The second processor may output the logging information to the first processor. The first processor may store the logging information in the log area.

Consequently, since the second processor, in lieu of the first processor, logs the command information, the time it takes to perform the logging operation may be reduced, and the first and second processors may be operated in parallel.

Figure 12:
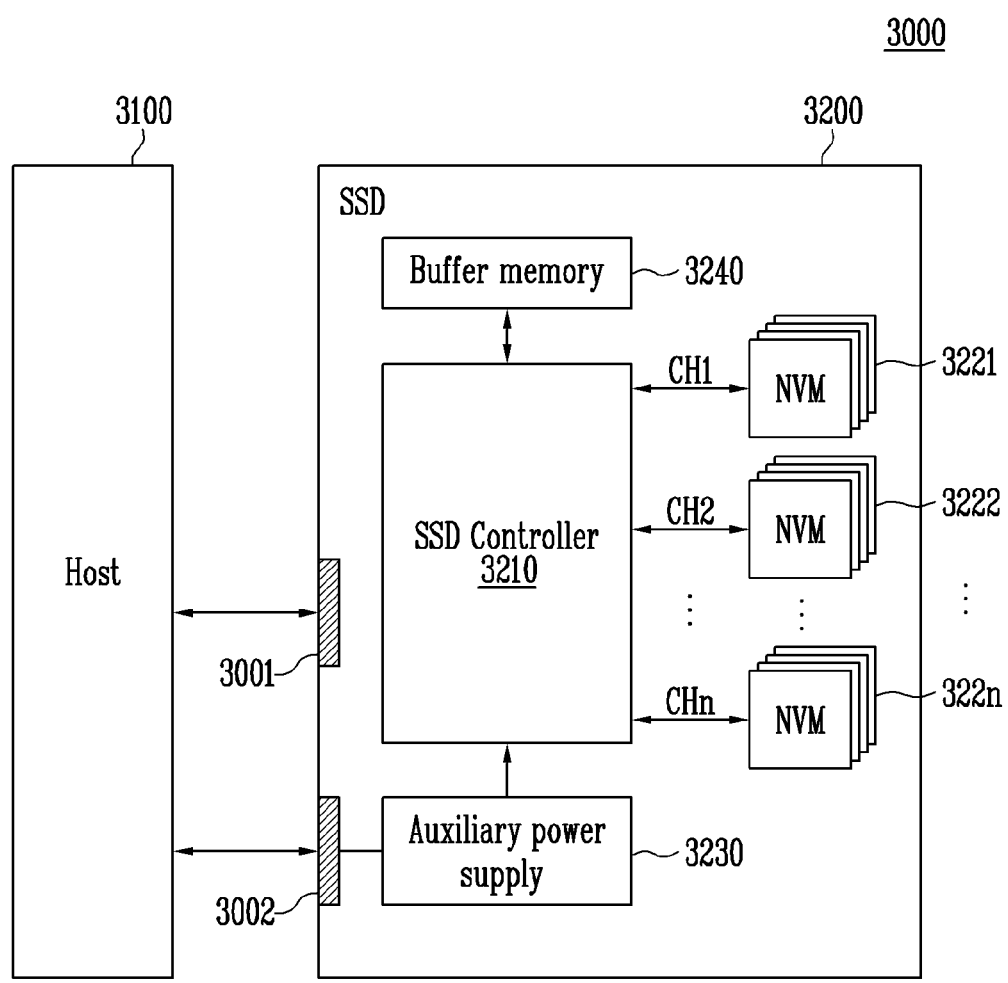
FIG. 12 is a block diagram illustrating a solid state drive (SSD) system to which the storage device in accordance with an embodiment of the present disclosure is applied.

FIG. 12 is a block diagram illustrating a solid state drive (SSD) system 3000 to which the storage device in accordance with an embodiment of the present disclosure is applied.

Referring to FIG. 12, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller (the memory controller 200 of FIG. 1), described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

In an embodiment, the SSD controller 3210 may include first and second processors. The first and second processors may be different types of processors, and include respective memories and access each other's memories. Furthermore, the first processor may perform an address translation operation of translating a logical block address into a physical block address through the flash translation layer. The second processor may perform data analysis and deep learning.

In an embodiment, the first processor may store command information corresponding to a command output to the plurality of flash memories 3221 to 322n, and request a register value stored in the register of the second processor. The register value may indicate whether the second processor is in the idle state. The second processor may output the register value to the first processor in response to the request from the first processor.

If the register value output to the first processor indicates that the second processor is in the idle state, the first processor may output a trigger signal and a command information address in which the command information is stored. The second processor may change the register value based on the trigger signal, and request, to the first processor, command information stored at a location corresponding to the command information address. Here, the second processor may change the register value in response to the trigger signal so that the idle state is released.

In an embodiment, the first processor may output the command information to the second processor in response to the command information request. After having output the command information, the first processor may perform another operation in lieu of logging the command information. In other words, while the second processor logs the command information, the first processor may perform an operation other than the logging operation.

The second processor may receive the command information from the first processor and log the command information, and generate the logging information. The second processor may output the logging information to the first processor. The first processor may store the logging information in the log area.

Consequently, since the second processor, in lieu of the first processor, logs the command information, the time it takes to perform the logging operation may be reduced, and the first and second processors may be operated in parallel.

Figure 13:
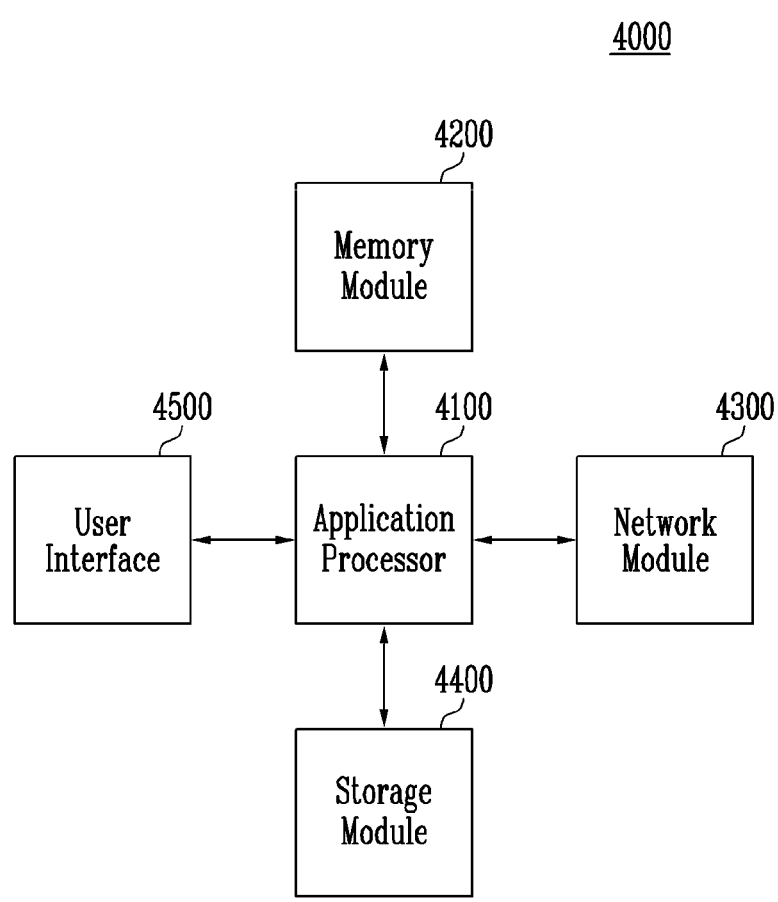
FIG. 13 is a block diagram illustrating a user system to which the storage device in accordance with an embodiment of the present disclosure is applied.

FIG. 13 is a block diagram illustrating a user system 4000 to which the storage device in accordance with an embodiment of the present disclosure is applied.

Referring to FIG. 13, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or WI-FI communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIGS. 2 and 3. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting Diode (OLED) display device, an active matrix OLED (AMOLED) display device, an LED, a speaker, a monitor, and so on.

In an embodiment, the application processor 4100 may include first and second processors. The first and second processors may be different types of processors, and include respective memories and access each other's memories. Furthermore, the first processor may perform an address translation operation of translating a logical block address into a physical block address through the flash translation layer. The second processor may perform data analysis and deep learning.

In an embodiment, the first processor may store command information corresponding to a command output to the storage module 4400, and request a register value stored in the register of the second processor. The register value may indicate whether the second processor is in the idle state. The second processor may output the register value to the first processor in response to the request from the first processor.

If the register value output to the first processor indicates that the second processor is in the idle state, the first processor may output a trigger signal and a command information address in which the command information is stored. The second processor may change the register value based on the trigger signal, and request, to the first processor, command information stored at a location corresponding to the command information address. Here, the second processor may change the register value in response to the trigger signal so that the idle state is released.

In an embodiment, the first processor may output the command information to the second processor in response to the command information request. After having output the command information, the first processor may perform another operation in lieu of logging the command information. In other words, while the second processor logs the command information, the first processor may perform an operation other than the logging operation.

The second processor may receive the command information from the first processor and log the command information, and generate the logging information. The second processor may output the logging information to the first processor. The first processor may store the logging information in the log area.

Consequently, since the second processor, in lieu of the first processor, logs the command information, the time it takes to perform the logging operation may be reduced, and the first and second processors may be operated in parallel.

In accordance with the present disclosure, after an idle state of a second processor is released, the second processor may log command information stored in the first processor, so that the first processor and the second processor may be operated in parallel.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller configured to control a memory device, the memory controller comprising:
a first processor configured to generate a command corresponding to a request received from a host, and translate a logical address included in the request into a physical address of the memory device; and
a second processor configured to operate on data to be output to the memory device or on data received from the memory device,
wherein if the request is received from the host when the second processor is in an idle state, the first processor controls the second processor to:
release the idle state of the second processor, and
perform an operation of logging command information corresponding to the request,
wherein the second processor outputs logging information by logging the command information, to the first processor, and
wherein the first processor stores the logging information in a log area.

2. The memory controller according to claim 1, wherein the first processor requests, after outputting the command to the memory device, a register value set in a register included in the second processor, and wherein the register value indicates whether the second processor is in the idle state.

3. The memory controller according to claim 2, wherein, if the register value indicates a state other than the idle state, the first processor requests the register value again.

4. The memory controller according to claim 2, wherein, if the register value indicates the idle state, the first processor outputs:
- a command information address indicating a location at which the command information is stored, and
- a trigger signal for releasing the idle state of the second processor.

5. The memory controller according to claim 4, wherein the second processor changes the register value based on the trigger signal so that the idle state is released.

6. The memory controller according to claim 4, wherein the second processor requests the command information based on the command information address.

7. The memory controller according to claim 6, wherein the second processor generates the logging information by logging the command information received from the first processor.

8. The memory controller according to claim 7, wherein the first processor performs an operation other than the operation of logging the command information while the second processor logs the command information.

9. The memory controller according to claim 7, wherein the second processor changes the register value after outputting the logging information.

10. The memory controller according to claim 9, wherein the second processor determines, after changing the register value, whether the trigger signal is received from the first processor.

11. The memory controller according to claim 10, wherein, if the trigger signal is received from the first processor, the second processor changes the register value again so that the idle state is released.

12. A method of operating a memory controller including a first processor and a second processor and configured to control a memory device, the method comprising:
- generating a command corresponding to a request received from a host, and translating a logical address corresponding to the request into a physical address of the memory device;
- outputting the command and the physical address to the memory device;
- determining whether the second processor is in an idle state;
- after the second processor enters the idle state, releasing the idle state of the second processor;
- controlling the second processor to perform an operation of logging command information corresponding to the request;
- outputting, by the second processor, logging information by logging the command information, to the first processor; and
- storing, by the first processor, the logging information in a log area.

13. The method according to claim 12, wherein determining whether the second processor is in the idle state comprises:
- requesting a register value set in a register included in the second processor; and
- determining whether the second processor is in the idle state based on the register value.

14. The method according to claim 13, wherein controlling the second processor comprises outputting, in response to the register value, a command information address indicating a location at which the command information is stored, and a trigger signal for releasing the idle state of the second processor.

15. The method according to claim 14, wherein releasing the idle state comprises releasing the idle state by changing the register value based on the trigger signal.

16. The method according to claim 15, further comprising requesting the command information based on the command information address.

17. The method according to claim 16, further comprising logging the command information and generating the logging information.

18. The method according to claim 17, wherein, while the second processor logs the command information, the first processor performs an operation other than the operation of logging the command information.

* * * * *